F. G. GRAVESTOCK.
GAME.
APPLICATION FILED JUNE 12, 1917.
1,263,230.
Patented Apr. 16, 1918.
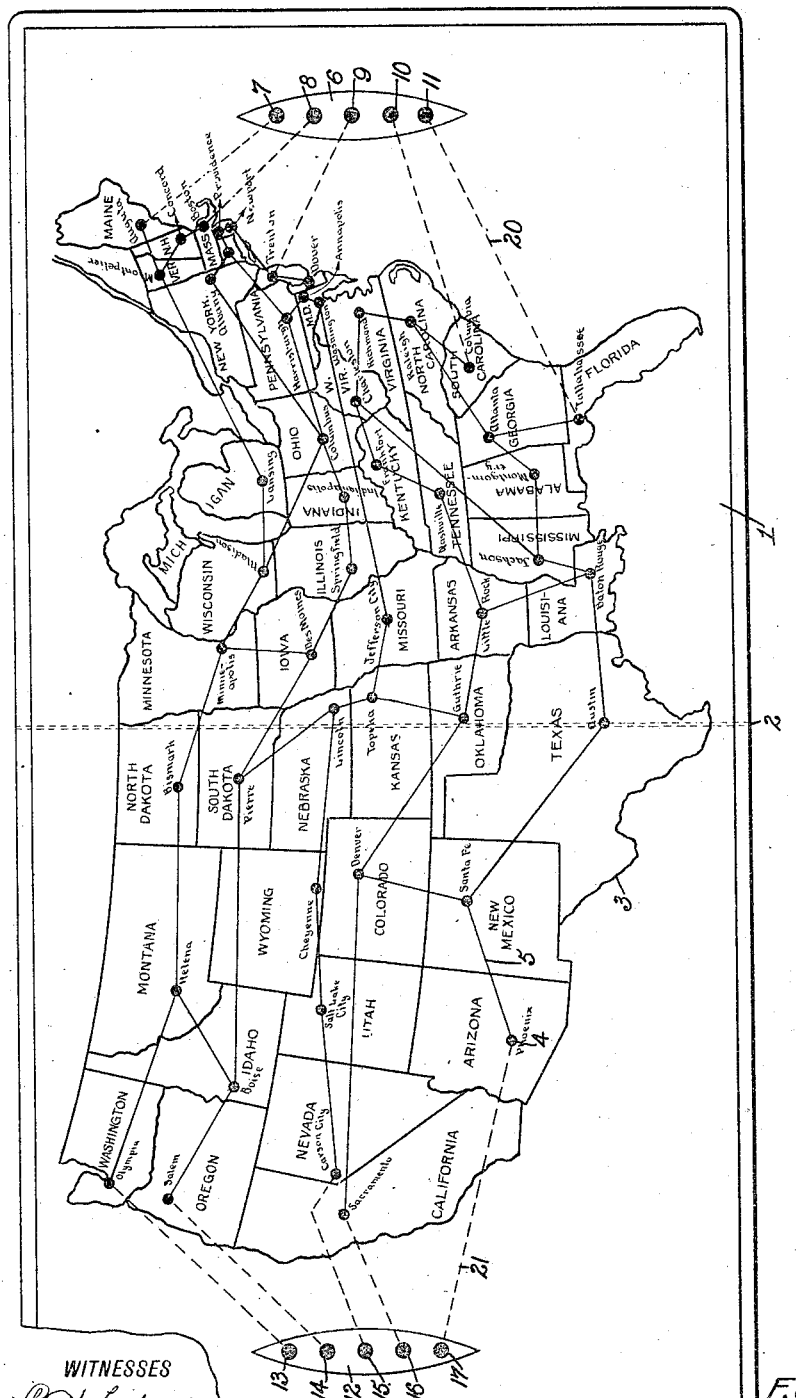
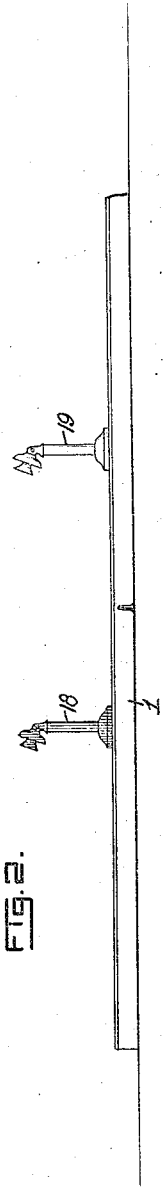
WITNESSES
INVENTOR
F.G.Gravestock.
BY
ATTORNEYS

UNITED STATES PATENT OFFICE.

FRANK GEORGE GRAVESTOCK, OF SAN FRANCISCO, CALIFORNIA, ASSIGNOR OF ONE-FIFTH TO VICTOR P. SCHMIT, OF POCATELLO, IDAHO.

GAME.

1,263,230.

Specification of Letters Patent.    Patented Apr. 16, 1918.

Application filed June 12, 1917.   Serial No. 174,224.

*To all whom it may concern:*

Be it known that I, FRANK G. GRAVESTOCK, a citizen of the United States, and a resident of San Francisco, in the county of San Francisco and State of California, have invented a new and Improved Game, of which the following is a full, clear, and exact description.

This invention relates to a combined educational chart and game and has for an object the provision of an improved construction whereby through the use of an amusement construction important information will be automatically taught.

Another object in view is to provide a chart showing a country and the subdivisions thereof with certain other information, and means associated therewith for use as a game whereby the subdivisions and other information of the country will be automatically learned during the playing of the game.

In the accompanying drawing:—

Figure 1 is a plan view showing a chart of the United States together with additions illustrating the game.

Fig. 2 is a fragmentary side view of part of the chart shown in Fig. 1, the same being on an enlarged scale so as to show the movable members.

In playing the game embodying the invention it is aimed to teach certain information, namely, the location of different cities and different subdivisions of the country so that a person more thoroughly informed along these lines may more easily and expeditiously play the game. As illustrating one form of the invention, Fig. 1 of the drawing shows a board 1 pivotally connected or hinged together at 2 and provided with a map 3 thereon, said map illustrating the United States with the subdivisions showing the various States of the Union. In addition to merely showing the subdivisions, the capitals of the various States are shown by large dots 4 connected by lines 5, the lines 5 running principally from east to west and indicating telephone connecting wires, whereby the eastern capitals may communicate with the central and western capitals. In the Atlantic Ocean is indicated a station 6 in the form of a battleship having posts 7, 8, 9, 10 and 11, while in the Pacific Ocean a station 12 is provided having posts 13, 14, 15, 16 and 17 arranged thereon, each post being independently connected with one of the western capitals, preferably the nearest western capital, while the eastern posts on the ship or station 6 are connected largely to the nearest eastern capitals along the Atlantic Ocean, though this is not absolutely necessary.

In playing the game a dark miniature telephone stand 18 may be used and also a light telephone stand 19, as shown in Fig. 2, there being one stand for each post on each of the stations 6 and 12. The wires of the game may vary as occasion may demand or as may be preferred, the principal aim being in all of the wires to have the telephone stand originally on the posts of station 6 transferred to the posts on station 12 after having passed over the lines 5 and certain of the capital cities 4.

Each player is entitled to one move, which in the first instance is a move from the station 6 or 12, as the case may be, to one of the capital cities over the dotted lines 20 and 21. The second move may be in any direction preferred but follows one of the lines 5. In case one of the players places a telephone upon a city next adjacent one occupied by the opposite player's telephone, said opposite player may jump the first mentioned player's telephone and after jumping may remove the first mentioned player's telephone and place it on any of the posts on his ship. These particular moves and others may be provided, as for instance, a requirement that certain of the telephones shall visit certain particular cities before completing the journey to the opposite side of the map. In this way persons playing the game will naturally repeat more or less often the names of the States and the capitals thereof so that they will become more or less familiar with the same in a short time.

As above stated, various moves may be provided but it is intended preferably to consider the posts on the ships or stations 6 and 12 to be wireless stations and with orders to send their message through certain cities to some particular post on the opposite ship. The miniature telephone stands 18 and 19 are to act as the wireless messages and are to be moved manually from city to city according to the orders issued, whereby the persons playing the game must be more or less familiar with the names of the cities or must familiarize themselves therewith in order to play with more or less expertness.

The orders may be limited; for instance, the orders may be to send a message from post 9 on ship 6 through Madison, Wis. An order of this kind would require that the miniature stand be taken from post 9 and placed on the spot indicated by Trenton, N. J., Dover, Del., Annapolis, Md., Harrisburg, Pa., Columbus, Ohio, and Madison, Wis. From Madison, Wis., the miniature telephone must be placed on Minneapolis, Minn., Bismarck, N. D., and Helena, Mont. From Helena, Mont., the player may have an option as to which way he moves the telephone stand unless he is limited to the particular post on station 12. If he is not limited to the particular post the best move would be to move the telephone stand from Helena, Mont., to Olympia, Wash., and from thence to post 13 on ship 12. However, if he is limited to post 14 he must necessarily move from Helena, Mont., to Boise City, Idaho, to Salem, Oreg., and from thence to post 14.

What I claim is:

1. An educational game of the character described, comprising a board formed with a map thereon showing political divisions, each political division having an indication in the form of a dot for indicating the capital of the particular political division, lines connecting said dots together in a predetermined manner, a plurality of posts or stations arranged on each side of the map, distinctive lines for connecting said posts with certain of the nearer dots, and movable members adapted to be positioned on said posts or stations and moved over said lines and dots during the playing of the game so that the movable members on one set of posts may be transmitted to the opposite set when the game has been finished.

2. An educational game, comprising a map divided into political divisions, a representation in each political division indicating a city, lines connecting some of said cities, said lines being so arranged that a continuous path may be traced from one side of the map to the other through various cities, a plurality of stations arranged on each side of said map, distinctive lines running from the stations on each side of the map to certain of the cities adjacent thereto, and movable members for movement according to prescribed rules over said lines and cities.

FRANK GEORGE GRAVESTOCK.